Patented Feb. 2, 1937

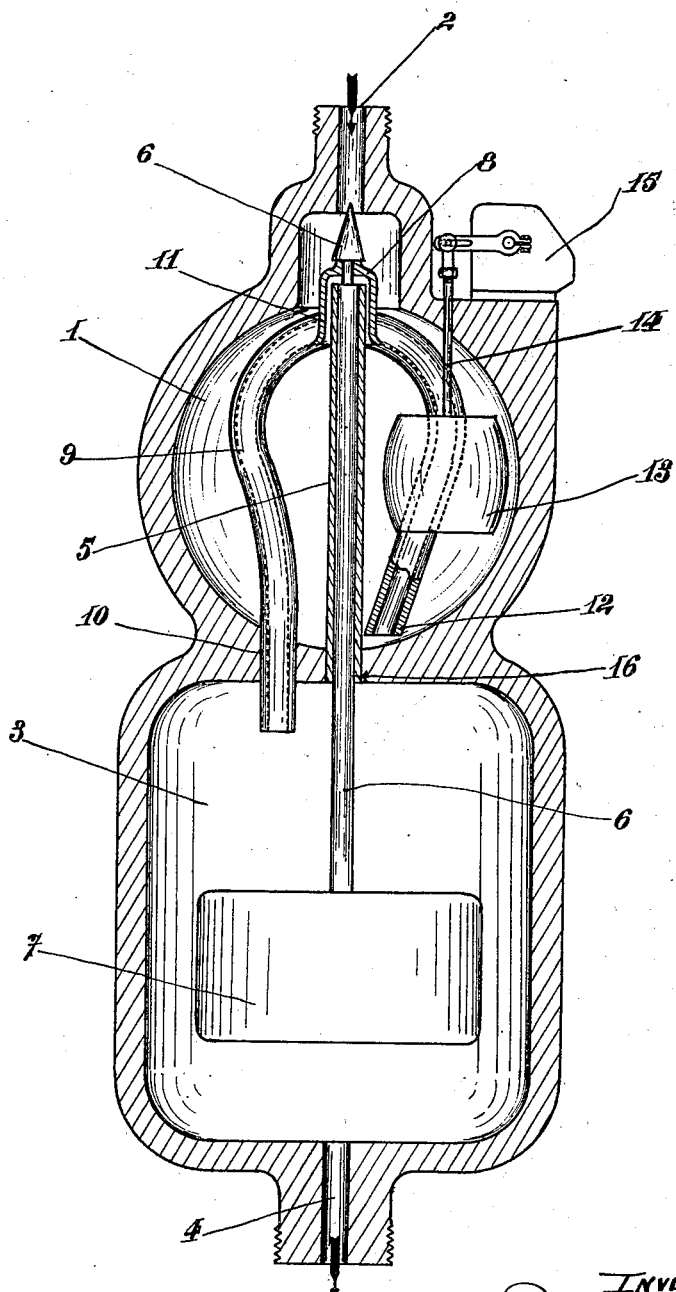

2,069,677

UNITED STATES PATENT OFFICE 2,069,677

LIQUID METER FOR REDUCED FLOWS AND LOW HEADS

Paul Ollagnon, Saint-Etienne, France

Application July 1, 1935, Serial No. 29,395
In France July 10, 1934

1 Claim. (Cl. 73—226)

The usual meters for liquids, comprising vane wheels or pistons, require a too great energy for their operation and cannot therefore be applied in the case of reduced flows and low heads.

The meter according to this invention only requires a very small amount of energy and it may be used for determining the quantities of liquid fuel fed to the carburetor of an internal combustion engine.

This meter operates according to the following cycle:—

1°. A continuous flow of liquid is transformed into a series of successive doses of constant volume.

2°. The number of these successive doses is registered by a registering mechanism of standard construction.

3°. The doses are again transformed into a continuous flow of liquid at the outlet of the apparatus.

The annexed drawing is a longitudinal section of a meter according to this invention.

The apparatus comprises a spherical chamber 1 having a determined capacity and provided with an inlet 2 at its highermost point. A second chamber 3 is disposed below chamber 1; the capacity of this second chamber is not carefully determined, but it is greater than the capacity of chamber 1. Chamber 3 is provided with an outlet 4 at its lowermost point.

There is provided an axial guiding tube 5 through chamber 1; this tube is tightly fixed at 16 and it guides a rod 6 driven by a float 7 disposed within chamber 3, rod 6 forming needle-valve at its upper end for the inlet 2 of chamber 1. An inverted cup 8 fixed to rod 6 and surrounding the upper end of tube 5 prevents any liquid from passing from chamber 1 to chamber 3 through said tube.

A syphon pipe 9 is disposed within chamber 1 and connects the latter at 10 with the lower chamber 3. The upper bend 11 of pipe 9 is at the highermost point of chamber 1 while the inlet 12 of this pipe is at the lowermost point of the same.

13 designates a float disposed within chamber 1; this float drives a rod 14 which in turn actuates a registering and adding mechanism 15 fixed above chamber 1.

The apparatus operates as follows:—

Chambers 1 and 3 being empty, float 7 is low and rod 6 leaves the inlet 2 open. The liquid to be metered thus flows into chamber 1 and fills the same, at the same time raising float 13.

When chamber 1 is filled, float 13 has actuated mechanism 15 which has registered a volume of liquid equal to the known capacity of chamber 1. On the other hand the syphon pipe 9 is started and the liquid rapidly flows from chamber 1 into chamber 3 until the former is emptied. Float 13 then resumes its low position and the apparatus is ready to receive a fresh charge of liquid into chamber 1.

Chamber 3 thus receives an intermittent supply of liquid from chamber 1 and it delivers a continuous flow thereof through outlet 4. When a sufficient number of charges has been supplied to chamber 3 to ensure the required continuous flow, float 7 will raise and actuate rod 6 which will close the inlet 2 until the level within chamber 3 is sufficiently low.

It is of course necessary that the quantity of liquid flowing through 2 or 10 be greater than the continuous flow in 4. It is also essential that the rate of flow of liquid through pipe 9 be greater than the rate of flow through inlet 2.

The liquid flowing through 2 thus enters chamber 3 only in the form of successive charges, each having a volume equal to the known capacity of chamber 1, these charges being each time registered and added by mechanism 15.

Owing to the spherical shape of chamber 1, the device is unaffected by inclinations such as may occur on road vehicles. It is very simple and reliable.

I claim:

A liquid meter comprising in combination a substantially spherical metering chamber having an inlet at its highermost point for the liquid to be metered; a flow-regulating chamber of large useful capacity beneath said metering chamber and adapted to receive charges of liquid issuing therefrom, said flow-regulating chamber having an outlet for the metered liquid; a syphon tube of large cross-section having its inlet at the lowermost point of said metering chamber, its upper bend in the vicinity of the highermost point of said metering chamber, and its downwardly directed outlet at the upper part of said flow-regulating chamber; a vertical guide tightly fixed at the lowermost point of said metering chamber and terminating short of the highermost point thereof; a float in said flow-regulating chamber; a rod having a needle valve directly carried by said last-named float, said rod being passed through said vertical guide and adapted for cooperation with the inlet of said metering chamber; an inverted cup-shaped member fixed to said rod and surrounding the upper end of said guide; a registering mechanism; and a float in said metering chamber to actuate said registering mechanism.

PAUL OLLAGNON.